No. 797,104. PATENTED AUG. 15, 1905.
J. R. FORDYCE.
SLACK ADJUSTER AND PULLEY ALINING DEVICE.
APPLICATION FILED JUNE 20, 1904.
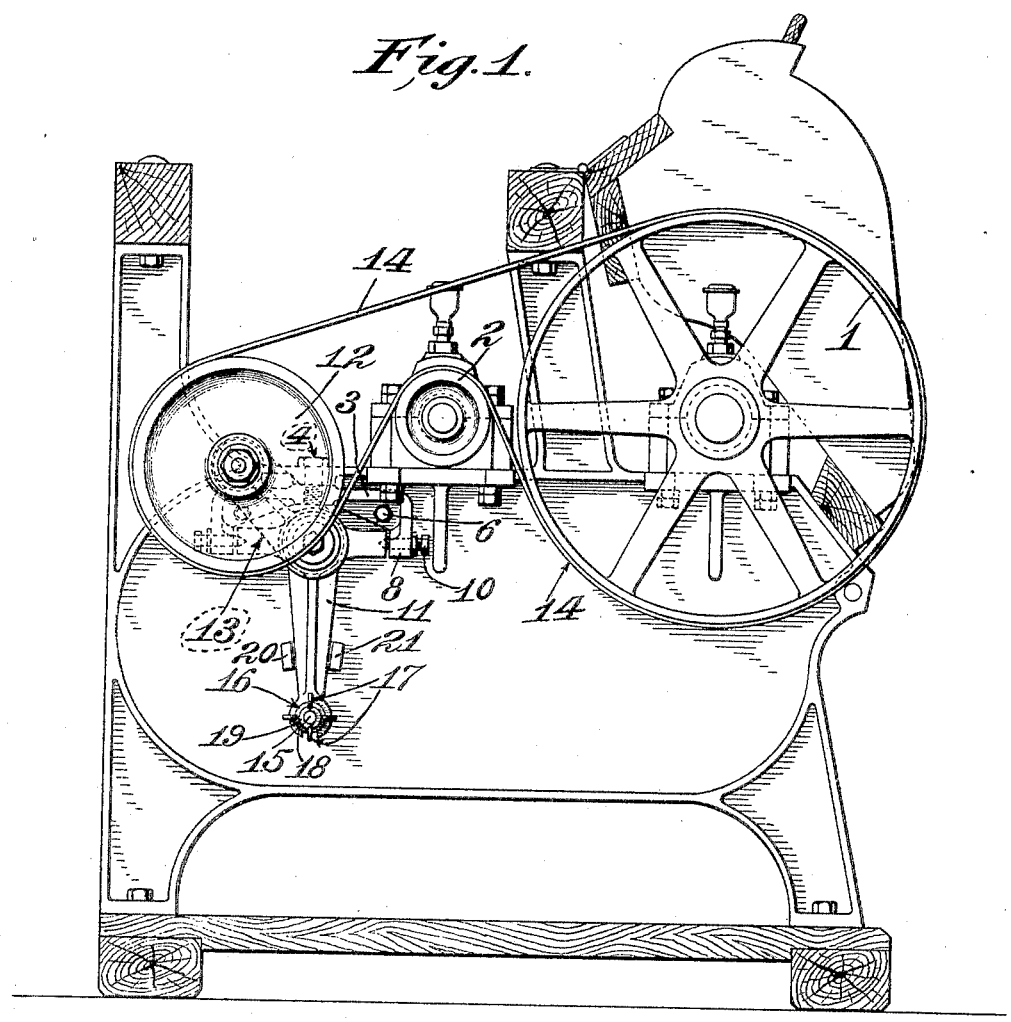
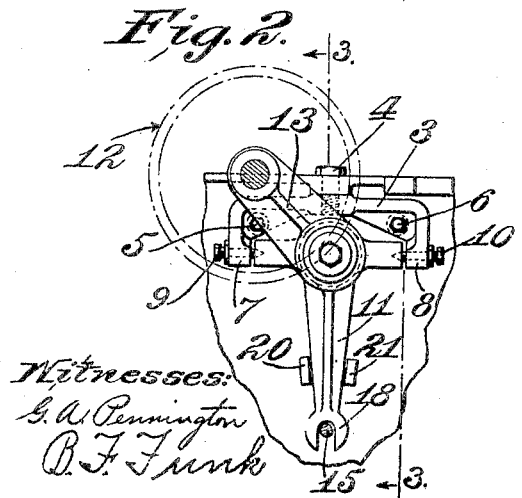
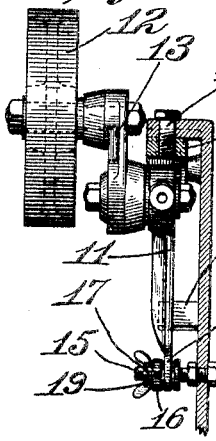
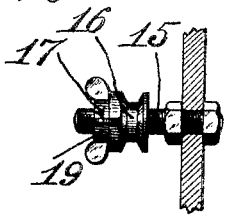
Witnesses:
G. A. Pennington
B. F. Funk
Inventor:
John R. Fordyce,
by Bakewell Cornwall
Attys

UNITED STATES PATENT OFFICE.

JOHN R. FORDYCE, OF LITTLE ROCK, ARKANSAS.

SLACK-ADJUSTER AND PULLEY-ALINING DEVICE.

No. 797,104.  Specification of Letters Patent.  Patented Aug. 15, 1905.

Application filed June 20, 1904. Serial No. 213,288.

*To all whom it may concern:*

Be it known that I, JOHN R. FORDYCE, a citizen of the United States, residing at Little Rock, Pulaski county, Arkansas, have invented a certain new and useful Improvement in Slack-Adjusters and Pulley-Alining Devices, of which the following is a full, clear, and exact description, such as will enable others skilled in the art to which it appertains to make and use the same, reference being had to the accompanying drawings, forming a part of this specification, in which—

Figure 1 is a side elevational view of a slack-adjuster constructed in accordance with my invention and applied to a cotton-gin. Fig. 2 is a detail view of the hanger, the adjusting-arm, and the pulley-supporting arm. Fig. 3 is a sectional view on the line 3 3 of Fig. 2, and Fig. 4 is an enlarged detail view of the adjusting-collar for alining the slack-adjusting pulley with the coöperating pulleys.

This invention relates to slack-adjusters, and is particularly designed to take up the slack in a belt.

One of the principal objects of the invention is to provide means whereby the slack will be automatically taken up and a determined tension be provided for the belt at all times; and it is also the object of the invention to provide means whereby the adjuster can be alined with the coöperating pulleys.

In order to illustrate the application of the invention, I have illustrated it as being applied to a cotton-gin, in which—

1 designates the pulley on the shaft carrying the gin-saws, and 2 is the pulley on the brush-shaft. Secured to the frame of the gin is a yoke-shaped bracket 3. This bracket is fastened to a projecting part of the gin by means of a bolt 4, which constitutes the axis on which the bracket is adapted to be moved.

5 and 6 designate fastening devices, which are illustrated as being in the form of screws, whereby the bracket 3 can be fixed in its adjusted position. The bracket 3 is provided with terminally-disposed journals 7 and 8, in which adjustable bearing-screws 9 and 10 are mounted.

11 designates an alining device comprising a T-shaped casting. This alining device is pivotally supported in the bracket by means of the screws 9 and 10 and is adapted to swing so that the pulley 12, carried on the loosely-mounted arm 13, which is supported on the casting, may be brought into alinement with the coöperating pulleys 1 and 2. The pulley 12 is of a weight sufficient to cause the belt to be stretched or tightened by the gravitation of said pulley 12. It will therefore follow that if the pulley 12 alines with the pulleys 1 and 2, and in view of the fact that the arm 13 is loosely mounted on the casting, said arm will vibrate or have swinging movement to accommodate the strains to which the belt 14 will be subjected.

Of course it is to be understood that the pulley 12 may be cast or otherwise formed, so that it will possess the desired weight to perform the function for which it is intended.

Means is provided for maintaining the pulley 12 in the position in which it has been adjusted. This means is illustrated as comprising a threaded projection 15, which is secured to the side of the gin or other device to which the alining device is secured. A threaded collar 16 is carried by the projection 15, and this collar is formed with wings 17, whereby the collar may be adjusted horizontally to swing the arm 13 in a horizontal plane, whereby the pulley 12 will be properly alined. The collar 16 is provided with a circumferential groove which is engaged by the bifurcated end 18 of the long arm of the casting 11, so that the movement of the collar 16 will impart movement to the arm 13 through the medium of the casting 11.

19 is a jam-nut which is designed to hold the collar in its adjusted position.

20 and 21 designate two parallel lugs which constitute guides for the long arm of the T-shaped casting 11, whereby the arm will be properly guided toward and away from the side of its support, and a sufficient amount of rigidity will be preserved to prevent wobbling of the casting due to vibration of the arm 13 when the belt is in motion.

Having thus described the invention, what is claimed as new, and desired to be secured by Letters Patent, is—

1. The combination with a support, of a bracket having depending portions, a T-shaped casting the transverse portion of which is pivoted at its ends in the depending portions of the bracket, an arm loosely mounted on said casting for supporting a pulley, said casting having a bifurcated end on the longitudinal portion, a threaded projection rigid on the support and extending between the sides of the bifurcated portion of the casting, and an adjusting device engaged by the bifurcated portion of the casting and threaded on the projection; substantially as described.

2. The combination with a support, of a bracket having depending portions provided with pivot-points, a casting having oppositely-disposed portions between the depending portions of the bracket and engaged by the pivot-points, said casting having a depending portion with a bifurcated end, a rigid projection on the support and adjacent the bifurcated portion of the casting and the rigid projection, and a pulley pivotally supported by the casting; substantially as described.

3. The combination with a bracket having depending portions, a casting having oppositely-projecting portions pivoted between the depending portions of the bracket, said casting being provided with a depending portion, a rigid projection adjacent the end of the depending portion of the casting, an adjusting device engaging the depending portion of the casting and the projection, and a pulley-supporting arm pivoted to the casting and having a movement in a plane at right angles to the swinging movement of the casting; substantially as described.

In testimony whereof I hereunto affix my signature, in the presence of two witnesses, this 13th day of June, 1904.

JOHN R. FORDYCE.

Witnesses:
    JAS. ALLEN,
    C. W. HALL.